United States Patent
Olsher et al.

(10) Patent No.: US 6,529,573 B2
(45) Date of Patent: Mar. 4, 2003

(54) PROTON RECOIL SCINTILLATOR NEUTRON REM METER

(75) Inventors: Richard H. Olsher, Los Alamos, NM (US); David T. Seagraves, Los Alamos, NM (US)

(73) Assignee: The Regents of the University of California, Los Alamos, NM (US)

(*) Notice: Subject to any disclaimer, the term of this patent is extended or adjusted under 35 U.S.C. 154(b) by 39 days.

(21) Appl. No.: 09/803,194

(22) Filed: Mar. 9, 2001

(65) Prior Publication Data

US 2002/0141529 A1 Oct. 3, 2002

(51) Int. Cl.[7] ................................. G01T 3/06
(52) U.S. Cl. .................. 376/153; 376/245; 376/159; 376/155; 250/390.01; 250/390.03; 250/390.11; 250/392; 250/492.1; 250/494.1; 250/518.1
(58) Field of Search ................ 376/153, 155, 376/159, 257, 245; 250/390.01, 390.03, 390.11, 392, 492.1, 494.1, 518.1

(56) References Cited

U.S. PATENT DOCUMENTS

| | | | | |
|---|---|---|---|---|
| 2,830,189 A | * | 4/1958 | Scherbatskoy | 250/392 |
| 2,900,516 A | * | 8/1959 | Davis et al. | 250/392 |
| 2,961,541 A | * | 11/1960 | Ruderman | 250/362 |
| 3,018,374 A | * | 1/1962 | Pritchett | 376/159 |
| 3,707,631 A | * | 12/1972 | Untermyer | 250/363.01 |
| 3,786,253 A | * | 1/1974 | Haffner et al. | 250/360.1 |
| 4,383,179 A | * | 5/1983 | Eisen et al. | 250/390.03 |
| 4,481,421 A | * | 11/1984 | Young et al. | 250/374 |
| 4,620,100 A | * | 10/1986 | Schoenig et al. | 250/358.1 |
| 5,029,262 A | * | 7/1991 | Schulte | 250/370.05 |
| 5,078,951 A | * | 1/1992 | August, Jr. | 250/392 |
| 5,278,417 A | * | 1/1994 | Sun | 250/390.03 |
| 5,828,069 A | * | 10/1998 | Umiastowski et al. | 250/390.01 |
| 6,011,266 A | * | 1/2000 | Bell | 250/269.2 |
| RE37,536 E | * | 2/2002 | Barnes | 250/361 R |
| 6,362,485 B1 | * | 3/2002 | Joyce et al. | 250/390.01 |

FOREIGN PATENT DOCUMENTS

| | | | |
|---|---|---|---|
| GB | 1240379 | * | 7/1971 |
| SU | 0843572 | * | 9/1983 |

OTHER PUBLICATIONS

Camp, Compton scatter suppression and pair spectrometer, proceedings Conference semi–conductor nuclear particle detectors, Gtlinburg, Tenn, USA–1968, pp. 693 to 702.*
Wiegand, High energy neutron detector, USAEC, AECD 2168, Jul. 1948, pp. 1 to 5.*

* cited by examiner

Primary Examiner—Michael J. Carone
Assistant Examiner—John Richardson
(74) Attorney, Agent, or Firm—Milton D. Wyrick

(57) ABSTRACT

A neutron rem meter utilizing proton recoil and thermal neutron scintillators to provide neutron detection and dose measurement. In using both fast scintillators and a thermal neutron scintillator the meter provides a wide range of sensitivity, uniform directional response, and uniform dose response. The scintillators output light to a photomultiplier tube that produces an electrical signal to an external neutron counter.

14 Claims, 3 Drawing Sheets

PROTON RECOIL SCINTILLATOR NEUTRON REM METER

The present invention generally relates to radiation measurement, and, more specifically relates to neutron rem measurement. This invention was made with Government support under Contract No. W-7405-ENG-36 awarded by the U.S. Department of Energy. The Government has certain rights in the invention.

BACKGROUND OF THE INVENTION

The great penetrating power of the neutron makes neutron radiation a particularly dangerous form of ionizing radiation. In fact, it is likely that neutron radiation may constitute a major portion of a radiation worker's annual radiation dose. A high dose of neutron radiation received in a matter of seconds can result in death. Even a fairly low dose can result in cancer or genetic damage to the recipient. For a worker to be safe, the dosage of neutron radiation must be regulated carefully and held below regulatory limits. To accomplish this, a radiation worker must utilize accurate and careful monitoring whenever neutron radiation is a possible hazard.

During the preceding 20 years, the locations where neutron radiation hazards exist have proliferated because of the increase in nuclear reactors and accelerators, radiotherapy facilities, plutonium-processing facilities, fusion research and isotopic sources. To attain a proper assessment of the neutron radiation hazards, and an accurate measurement of radiation worker dosage, a precise and sensitive neutron meter, having a wide energy range is required.

The prior art neutron rem meters not only suffer from limited sensitivity and accuracy, but they also have been both heavy and bulky. These prior neutron rem meters have used gas detectors with bulky and heavy moderators to monitor exposure to neutron radiation. These gas detectors rely on a gas such as boron trifluoride ($BF_3$), which is excellent in detecting low-energy, or thermal neutrons having energies of approximately 0.025 eV. To obtain the high-energy response, however, the gas detectors must use a heavy polyethylene shell weighing approximately 20 pounds as a moderator to slow fast neutrons. This polyethylene moderator extends the gas detector's response only to approximately 10 MeV.

Over the course of the last decade, moderator inserts of lead or tungsten have improved the high energy response of some detectors, but at a significant cost in terms of weight. These detectors can weigh 30 or more pounds, a weight that can result in muscle strain in the backs, arms, and shoulders of persons who repeatedly lift such detectors. Even with the lead or tungsten moderators, the high-energy response deficiencies of prior art detectors can cause these detectors to underestimate the neutron hazard in certain applications.

These gas-based detectors are also difficult and costly to maintain. The gas detectors have to be replaced every three years at significant expense.

Throughout the world, neutron rem meters are used by health physicists for real-time measurement of neutron dose equivalent. The neutron rem meter has become the instrument of choice in radiation fields in which the neutron spectrum is unknown or is poorly characterized. They also are useful in detecting and quantifying radiation hazards around nuclear reactors, accelerators, isotopic and fusion sources. However, the problems with prior art detectors, which have been outlined above, have limited the usefulness of most detectors in many applications. The bulk and weight of the prior art detectors have limited their application. The lack of high-energy response has rendered them of limited value in other applications.

The present invention provides a scintillator-based neutron rem meter that is light, compact, and responsive to high-energy neutrons. The present invention is designed to be a hand-held device. It weighs only about 4 pounds and is compatible with most neutron counters. The present invention operates under the principle of proton recoil, in which neutrons strike protons. The protons recoil and strike grains of scintillating material. This collision releases energy in form of optical photons.

It is therefore an object of the present invention to provide a neutron rem meter that is responsive to high-energy neutrons.

It is another object of the present invention to provide a neutron rem meter that is light in weight.

It is yet another object of the present invention to provide a neutron rem meter having uniform directional response.

It is still another object of the present invention to provide a neutron rem meter that is compatible with most current neutron counters.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, a neutron rem meter comprises a lightguide defining a cylindrically shaped penetration, with a plurality of first moderators each of the moderators defining a central aperture and individually mounted to the lightguide. A second moderator defines a central aperture coaxial with the cylindrically shaped penetration in the lightguide and mounted to the lightguide. A plurality of fast neutron scintillators, individually mounted in the central aperture of each of the plurality of first polyethylene moderators, and a cadmium filter, a thermal neutron scintillator, a plastic spacer and a photomultiplier tube located inside the cylindrically shaped penetration in the lightguide.

In another aspect of the present invention and in accordance with its principles and purposes A neutron rem meter comprises a cubical lightguide defining a cylindrically shaped penetration and having a top, bottom and sides, with four first moderators each of the four first moderators defining a central aperture and individually mounted to the four sides of the cubical lightguide. A second moderator defines a central aperture coaxial with the cylindrically shaped penetration in the lightguide and mounted to the top of the cubical lightguide. A third moderator is mounted to the bottom of the cubical lightguide. Four fast neutron scintillators are individually mounted in the central aperture of each of the four first moderators, and a cadmium filter, a thermal neutron scintillator, a plastic spacer and a photomultiplier tube are located inside said cylindrically shaped penetration in the lightguide.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides a proton recoil scintillator neutron rem meter that is lightweight, accurate and responsive to high-energy neutrons. The invention can be understood most easily through reference to the drawings.

Figure 1:
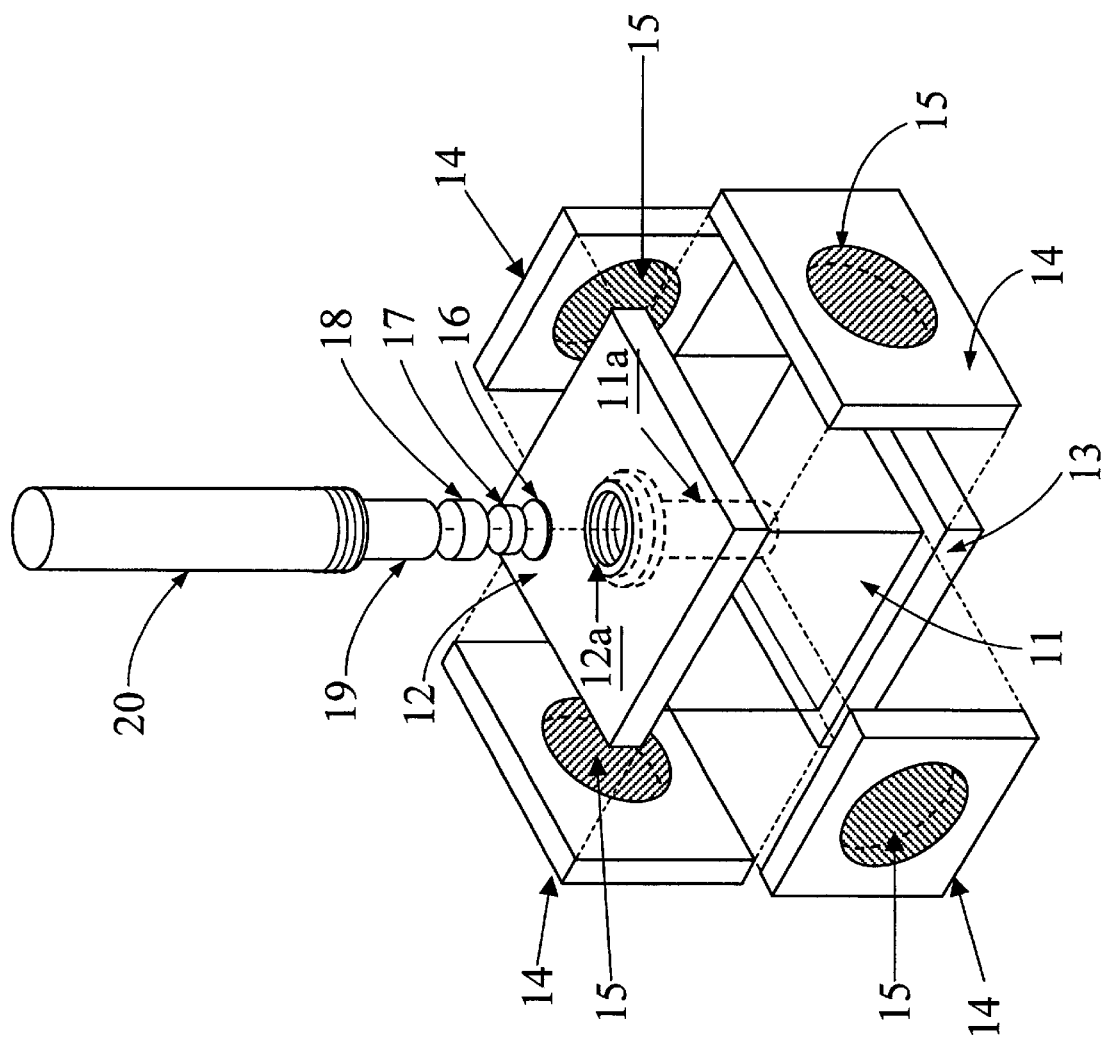
FIG. 1 is exploded perspective view of an embodiment of the present invention.

In FIG. 1, an exploded perspective view of the present invention can be seen. Here, lightguide 11 is surrounded on each face by top plate 12, bottom plate 13, and side plates 14. Each side plate 14 defines central aperture for insertion of fast neutron scintillators 15.

As illustrated, lightguide 11 defines a central penetration 11a and top plate 12 defines a central aperture 12a that is coaxial with central penetration 11a. Central aperture 12a and central penetration 11a receive cadmium filter 16, thermal neutron scintillator 17, plastic spacer 18 and photomultiplier tube 19. Photomultiplier tube 19 is a side-view photomultiplier tube having a bialkali photcathode.

Photomultiplier tube 19 is covered by PMT handle 20 that is screwed into threads in central aperture 12a of top plate 12. PMT handle 20, in addition to protecting photomultiplier tube 19, also provides a convenient handle for using the present invention. Electrical connections (not shown) can exit from the end of PMT handle 20.

Lightguide 11 and plastic spacer 18 are made of LUCITE®. Top plate 12, bottom plate 13, and side plates 14 can be made of various moderating materials, including but not limited to polyethylene and 5% Borated Polyethylene. Cadmium filter 16 can have a thickness of approximately 0.030 inch. Thermal neutron scintillator 17 is a BC-702 (20% loading) thermal neutron scintillator, which will be described in greater detail below. Lead may also be substituted for cadmium for thermal neutron scintillator 17 if a reduced loading (8%) BC-702 scintillator is used.

Fast neutron scintillators 15 are LUCITE® disks with concentric grooves that are filled with a mixture of hydrogenous epoxy and an appropriate phosphor. In one embodiment of the present invention, the phosphor may be a silver-activated zinc sulfide ZnS(Ag). This mixture provides the protons for the proton recoil action of the present invention.

With these fast neutron scintillators 15 positioned around lightguide 11 that serves as a light guide. Any neutrons striking fast neutron scintillators 15 will produce, through proton recoil, protons that excite the phosphor. Light emission from the phosphor is directed by lightguide 11 to photomultiplier tube 19. From stimulation provided by these light photons, photomultiplier tube 19 produces an electrical current that can be provided to an external neutron counter (not shown).

Deep inside lightguide 11 the present invention provides thermal neutron scintillator 17. Similar to fast neutron scintillators 15, thermal neutron scintillator 17 is made of LUCITE®, and can have a mixture of ZnS(Ag) and $^6$Li-enriched (20%) lithium fluoride that has been hot pressed in a convoluted layer onto the surface of the LUCITE®. In thermal neutron scintillator 17, any thermal neutrons are strongly absorbed by the $^6$Li nucleus, which breaks into two charged particles, an alpha and a triton, that travel to the nearest phosphor grain and excite it. This excitation produces light emission for photomultiplier tube 19. The convolutions in thermal neutron scintillator 17 provide extra surface area to maximize light output, as do the grooves in fast neutron scintillators 15.

The combination of fast neutron scintillators 15 with thermal neutron scintillator 17 is an innovation that allows the present invention to be a superior neutron rem meter. This combination gives the present invention greatly increased sensitivity (approximately a factor of ten more sensitive than the most popular prior art neutron rem meter), and a wide energy response, extending from 0.025 eV to greater than 20 MeV. It is expected that future testing at a cyclotron facility will confirm a much higher response. The lack of a thick moderator allows the present invention to be small and lightweight.

It is a feature of the present invention that the sensitivity of thermal neutron scintillator 17 is adjusted with respect to fast neutron scintillators 15 to obtain a dose response. Since fast neutrons are more effective in producing a biological dose, the sensitivity of thermal neutron scintillator 17 must be scaled down to achieve this result. This is accomplished by controlling the $^6$Li loading in thermal neutron scintillator 17 or by using a cadmium filter, or a combination of a filter and $^6$Li loading, to preferentially absorb thermal neutrons.

The use of an array of fast neutron scintillators 15, as illustrated in FIG. 1, provides a uniform directional response. The dose response of the proton recoil scintillator neutron rem meter 10 is minimally affected by the orientation of the probe assembly relative to the neutron source.

Proton recoil scintillator neutron rem meter 10 can be lifted repeatedly from the knee level to above the head without causing injury. Its small size enables a worker to use it in spaces too small for prior art meters. Such small places include the tight spots behind gloveboxes, between storage drums, or around radiotherapy accelerators in cancer-treatment facilities. In sum, proton recoil scintillator neutron rem meter 10 is an accurate, sensitive, easy to lift, easy to maneuver neutron rem meter that provides more complete monitoring of a work environment and a concurrent more accurate assessment of neutron hazards.

Since there are no pure neutron-radiation fields, accurate neutron measurement requires distinguishing between neutrons and gamma rays. The gas detectors of the prior art possess excellent gamma rejection, while plastic or glass scintillators do not. Because of this fact, the present invention rejected plastic or glass scintillators. In proton recoil scintillator neutron rem meter 10, ZnS(Ag) scintillators are used and provide a good inherent gamma discrimination capability. Neutrons produce a larger light pulse relative to gamma radiation. Pulse height discrimination in an external counter (4 mV to 5 mV) is then used to reject competing gamma pulses. This allows proton recoil scintillator neutron rem meter 10 to provide gamma discrimination up to 100 mR/h. Although prior art detectors provide better gamma rejection, their extra weight and size severely limits their usefulness. Although not shown in FIG. 1, proton recoil scintillator neutron rem meter 10 may be covered in lead foil for actual use.

It is to be understood that although FIG. 1 illustrates a cubical configuration for proton recoil scintillator neutron rem meter 10, other configurations are possible as long as they provide sufficient faces in which neutrons can strike fast neutron scintillators 15. Shapes including but not limited to spherical and hexagonal could be used.

TESTING (a) Energy Response:

Proton recoil scintillator neutron rem meter 10 was irradiated at the German Bureau of Standards' (PTB) Accelerator Facility, located in Braunschweig, Germany. The probe was positioned in a series of monoenergetic neutron beams, spanning the energy range from 0.144 MeV to 19 MeV. These standard beams are produced by accelerating protons and deuterons onto a variety of targets. The energy and intensity of these beams have been extensively characterized by the Neutron Dosimetry staff of the PTB using spectral measurements, including time of flight techniques. The Eberline E-600 counter was used for all of the data collection.

Figure 2:
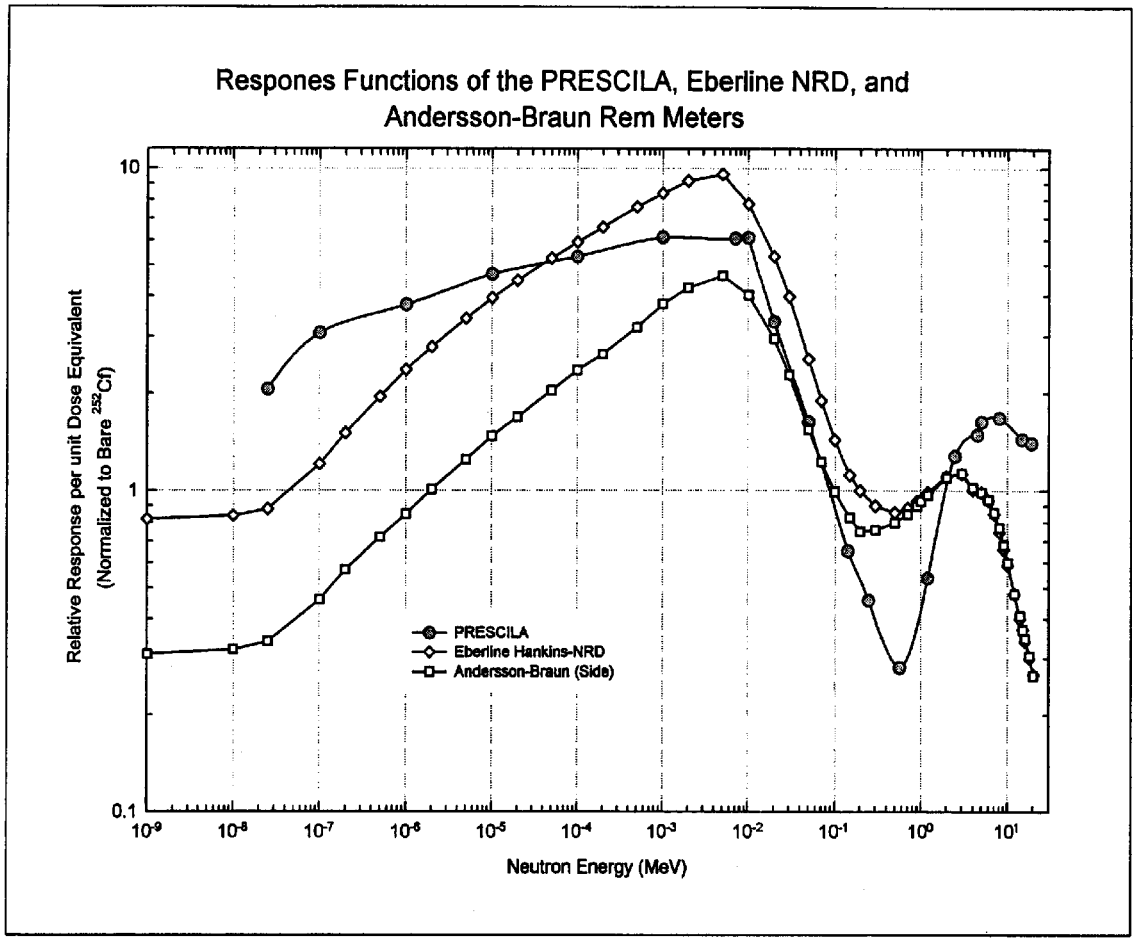
FIG. 2 is graph comparing the responses of the present invention with the detectors manufactured by others over the neutron energy range of $2.53 \times 10^{-8}$ MeV to 20 MeV.

Proton recoil scintillator neutron rem meter 10 was irradiated at each technique with and without a shadow cone to determine the room return. The room return was subtracted from the gross measurement to obtain the net count. Reference should now be made to FIG. 2 where the results of these measurements are shown. The response function shown for proton recoil scintillator neutron rem meter 10 below 0.144 is based on Monte Carlo calculations using the Los Alamos National Laboratory code MCNP™. A detailed model was used to track neutrons though the proton recoil scintillator neutron rem meter 10 assembly.

Also in FIG. 2, the absolute response of thermal scintillator 17 was calculated in terms of total number of capture reactions in $^6$Li. The result was adjusted to match the experimentally determined response at 0.144 MeV. Also shown in FIG. 2 are the calculated response functions for the Eberline NRD and the Andersson-Braun (AB) type of rem meters (e.g., the Aptec-NRC NG-2). These models are the most popular commercial rem meters in use today. In fact, the Eberline NRD is currently the standard rem meter in the Los Alamos National Laboratory inventory. All of the response functions were normalized to a bare $^{252}$Cf field. This simulates the effect of a bare $^{252}$Cf calibration.

Figure 3:
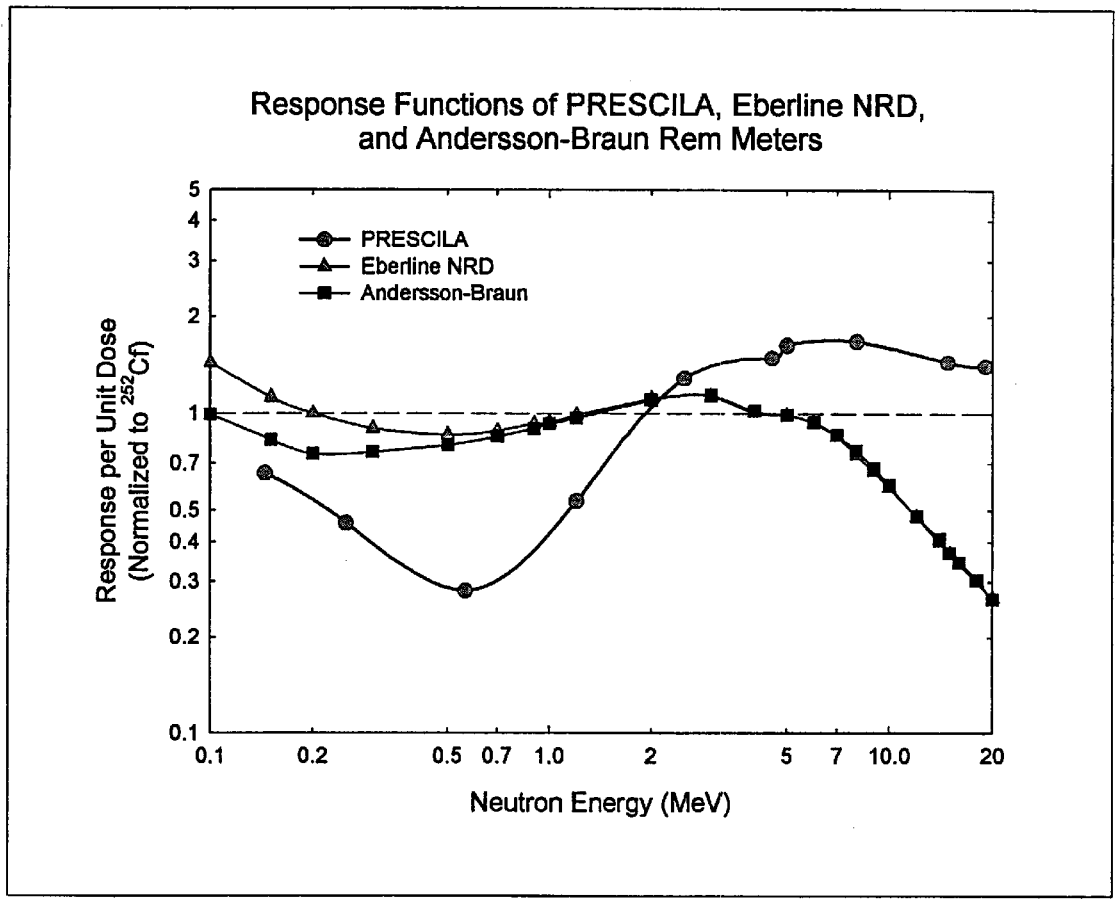
FIG. 3 is a graph comparing the responses of the present invention with the detectors manufactured by others over the neutron energy range of 0.1 MeV to 20 MeV.

The ideal response per unit dose is, of course, a uniform response of 1.0 at all neutron energies. All rem meters deviate from the ideal significantly. Below 0.1 MeV, the present invention's energy response is similar to that of current commercial models. In the range from 0.1 MeV to 1.0 MeV, the present invention under responds with the response minima of 0.28 being at energy of 0.565 MeV. The under response balances the over response at lower energies, ensuring a more uniform response for typical field spectra, which cover a wide energy range. The energy range of 0.1 MeV to 20 MeV is expanded in FIG. 3 to show the high-energy response of the various rem meters. Both the NRD and AB meters decrease monotonically in response above 7 MeV, whereas proton recoil scintillator neutron rem meter 10 (FIG. 1) is quite flat from 2 MeV to 19 MeV, the high-energy limit of the PTB facility. However, its high-energy response is expected to be extended to at least 70 MeV. It is hoped that future testing at a suitable Cyclotron facility will allow confirmation of the response beyond 20 MeV.

(b) Neutron Response Sensitivity:

The sensitivity (cpm/mrem/h) was established in the three NIST-traceable isotopic fields available at Los Alamos National Laboratory: $^{241}$AmBe, bare $^{252}$Cf, and D$_2$O-moderated $^{252}$Cf. The results are summarized in Table 1 below. Also shown for reference purposes are the corresponding measurements for the Eberline NRD.

TABLE 1

| Model | Bare $^{252}$Cf (cpm/mrem/h) | Moderated $^{252}$Cf (cpm/mrem/h) | 241AmBe (cpm/mrem/h) |
|---|---|---|---|
| PRESCILA | 402 | 544 | 543 |
| Eberline NRD | 39 | 51.4 | 30.7 |

Relative to the Eberline NRD, the present invention features an order of magnitude increase in sensitivity. Such sensitivity makes it feasible for the present invention to be used for real-time measurements of environmental-level neutron fields.

(c) Directional Response:

The proton recoil scintillator rem meter 10 was tested for directional response at both the German Bureau of Standards (PTB) and at the Los Alamos National Laboratory. Directional dependence was found to be minimal, typically within 10% for both intermediate and fast neutron energies.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A neutron rem meter comprising:

a lightguide defining a cylindrically shaped penetration;

a plurality of first moderators each of said first moderators defining a central aperture and individually mounted to said lightguide;

a second moderator defining a central aperture coaxial with said cylindrically shaped penetration in said lightguide;

a plurality of fast neutron scintillators individually mounted in said central aperture of each of said plurality of first moderators; and a cadmium filter, a thermal neutron scintillator, a plastic spacer and a photomultiplier tube located inside said cylindrically shaped penetration in said lightguide;

wherein sensitivity of said thermal neutron scintillator is scaled to produce an accurate dose response.

2. The neutron rem meter described in claim 1 wherein said first and second moderators comprise polyethylene.

3. The neutron rem meter described in claim 1 wherein said first and second moderators comprise borated polyethylene.

4. The neutron rem meter described in claim 1 wherein said plurality of fast neutron scintillators comprise a disk of LUCITE® defining grooves filled with a mixture of a hydrogenous epoxy and a phosphor.

5. The neutron rem meter described in claim 4 wherein said phosphor comprises a silver-activated zinc sulfide.

6. The neutron rem meter described in claim 1 wherein said thermal neutron scintillator comprises a disk of LUCITE® with a mixture of a silver-activated zinc sulfide and $^6$Li-enriched (20%) lithium fluoride hot pressed in a convoluted layer into said disk.

7. The neutron rem meter described in claim 1 wherein said thermal neutron scintillator comprises a disk of LUCITE® with a mixture of a silver-activated zinc sulfide and ⁶Li-enriched (8%) lithium fluoride hot pressed in a convoluted layer into said disk.

8. A neutron rem meter comprising:

a cubical lightguide defining a cylindrically shaped penetration and having a top, bottom and four sides;

four first moderators each of said four first moderators defining a central aperture and individually mounted to said four sides of said cubical lightguide;

a second moderator defining a central aperture coaxial with said cylindrically shaped penetration in said lightguide mounted to said top of said cubical lightguide;

a third moderator mounted to said bottom of said cubical lightguide;

four fast neutron scintillators, individually mounted in said central aperture of each of said four first moderators; and a cadmium filter, a thermal neutron scintillator, a plastic spacer and a photomultiplier tube located inside said cylindrically shaped penetration in said lightguide;

wherein sensitivity of said thermal neutron scintillator is scaled to produce an accurate dose response.

9. The neutron rem meter described in claim 8 wherein said first four moderators and said second and third moderators comprise polyethylene.

10. The neutron rem meter described in claim 8 wherein said first four moderators and said second and third moderators comprise borated polyethylene.

11. The neutron rem meter described in claim 8 wherein said plurality of fast neutron scintillators comprise a disk of LUCITE® defining grooves filled with a mixture of a hydrogenous epoxy and a phosphor.

12. The neutron rem meter described in claim 11 wherein said phosphor comprises a silver-activated zinc sulfide.

13. The neutron rem meter described in claim 8 wherein said thermal neutron scintillator comprises a disk of LUCITE® with a mixture of a silver-activated zinc sulfide and ⁶Li-enriched (20%) lithium fluoride hot pressed in a convoluted layer into said disk.

14. The neutron rem meter described in claim 8 wherein said thermal neutron scintillator comprises a disk of LUCITE® with a mixture of a silver-activated zinc sulfide and ⁶Li-enriched (8%) lithium fluoride hot pressed in a convoluted layer into said disk.

* * * * *